United States Patent
Löffler et al.

[11] Patent Number: 6,154,701
[45] Date of Patent: Nov. 28, 2000

[54] METHOD AND DEVICE FOR CONTROLLING THE DRIVE TRAIN OF A MOTOR VEHICLE

[75] Inventors: Jürgen Löffler, Winnenden; Martin-Peter Bolz, Oberstenfeld; Holger Hülser, Stuttgart, all of Germany

[73] Assignee: Robert Bosch GmbH, Stuttgart, Germany

[21] Appl. No.: 09/155,755

[22] PCT Filed: Jan. 15, 1998

[86] PCT No.: PCT/DE98/00120

§ 371 Date: Dec. 18, 1998

§ 102(e) Date: Dec. 18, 1998

[87] PCT Pub. No.: WO98/33673

PCT Pub. Date: Aug. 6, 1998

[30] Foreign Application Priority Data

Feb. 3, 1997 [DE] Germany ............... 197 03 863

[51] Int. Cl.$^7$ ............ G06F 17/00; G06F 19/00; G06F 7/00
[52] U.S. Cl. ............ 701/54; 701/1; 701/84; 701/87; 701/88; 477/110; 477/115
[58] Field of Search ............ 701/1, 53, 54, 701/84, 87, 88, 93, 110; 477/110, 115, 120

[56] References Cited

U.S. PATENT DOCUMENTS

| | | | |
|---|---|---|---|
| 4,775,938 | 10/1988 | Hiramatsu | 701/60 |
| 4,893,526 | 1/1990 | Tokoro . | |
| 5,025,684 | 6/1991 | Stehle et al. . | |
| 5,046,995 | 9/1991 | Russell | 475/170 |
| 5,157,609 | 10/1992 | Stehle et al. . | |
| 5,557,519 | 9/1996 | Morita | 701/1 |
| 5,603,673 | 2/1997 | Minowa et al. | 477/110 |

FOREIGN PATENT DOCUMENTS

| | | |
|---|---|---|
| 0474401 | 3/1992 | European Pat. Off. . |
| 0 719966 | 7/1996 | European Pat. Off. . |

OTHER PUBLICATIONS

"CVT–Getriebe: Elektronische Regelung und Fahrdynamik" by U. Eggert, Mar. 1992, VDI Z, vol. 134, No. Special, pp. 26 to 49.

"Die Adaptive Getriebesteuerung für die Automatikgetriebe der BMW Fahrzeuge mit Zwölfzylindermotor" by A. Welter et al, ATZ 94, (1992), p. 428 to 435.

"Die Adaptive Getriebesteuerung für BMW–Automobile" by A. Welter et al, ATZ Automobiltechnische Zeitschrift 95 (1993), p. 420 to 434.

*Primary Examiner*—William A. Cuchlinski, Jr.
*Assistant Examiner*—Gertrude Arthur
*Attorney, Agent, or Firm*—Walter Ottesen

[57] ABSTRACT

The invention proceeds from a control of the drive train of a motor vehicle having at least a drive unit and an automatic transmission. During driving operation, a desired value for the drive torque of the vehicle or for the transmission output torque is pregiven by the driver. The different operating points of the drive train are characterized by at least different output torques of the drive unit and rpm ratios and/or different output rpms of the drive unit. The essence of the invention is that, during driving operation, a set of evaluation quantities is determined for each possible operating point. One of the possible operating points is then selected as an optimal operating point via an optimization method based on the determined evaluation quantities. The transmission ratio, which belongs to this selected optimal operating point, is then adjusted on the transmission. As an alternative to adjusting the transmission ratio, it is understood that the output rpm of the drive unit can be adjusted by a change of the transmission ratio with this output rpm corresponding to the selected operating point.

16 Claims, 5 Drawing Sheets

METHOD AND DEVICE FOR CONTROLLING THE DRIVE TRAIN OF A MOTOR VEHICLE

FIELD OF THE INVENTION

The invention proceeds from a method and an arrangement for controlling the drive train of a motor vehicle.

BACKGROUND OF THE INVENTION

In motor vehicles having internal combustion engines, the rpm range and the torque range of the engine is imaged on the rpm range and torque range at the wheels via a transmission and, if required, a torque converter (hydrodynamic torque converter with/without bridge clutch or a dry-friction clutch). Here, a transmission output torque for a given transmission output rpm can be realized with various gear ratios.

In U.S. Pat. No. 4,893,526, a desired value for the transmission output torque is determined from the vehicle speed and the position of the accelerator pedal actuated by the driver. In such so-called E-gas systems, the driver of the vehicle does not directly pregive the engine output torque via the accelerator pedal, for example, via a direct coupling of the accelerator pedal to the throttle flap; instead, the driver determines a propulsion torque at the wheels or a transmission output torque with the accelerator pedal position. A desired value for the engine rpm is determined in dependence upon this desired output torque and the vehicle speed. This desired value for the engine rpm is adjusted by the shifting of a continuously variable vehicle transmission. Furthermore, the desired output torque as well as the adjusted transmission ratio are applied for adjusting the engine torque. In lieu of an E-gas system, another system for engine power control, such as an electronic diesel injection control (EDC, Electronic Diesel Control) can be provided.

In the article entitled "Spezial Antriebstechnik", VDI-Zeitschrift, No. 134, March 1992, pages 26 to 49, a description is provided of determining a desired engine rpm in dependence upon throttle flap angle of the vehicle engine. This desired engine rpm is adjusted via an adjustment of a continuously variable transmission. Furthermore, it is described in this article to select the desired engine rpm also in dependence upon different driving programs. Such driving programs take into account the characteristic of the driver. The driver characteristic is represented by more of a consumption optimized or more of a driving power orientated driving style of the driver.

For vehicle drives having a drive unit with an E-gas or another engine power control, a torque converter and a transmission (automatic stepped transmission, automated switching transmission, continuously variable transmission), it is the task of the drive train control to so adjust the operating point of the drive train that the desired torque is available at the transmission output. The operating points of the drive train are characterized by the engine rpm, the engine output torque, the rpm ratio of the transmission, the rpm ratio and the state of the torque converter.

For the determination of the operating point, the entire degree of the efficiency of the drive train, the torque reserve at the transmission output as well as the emission viewpoints are to be considered.

In today's control architectures, the operating point of the drive train is determined by the selection of the transmission ratio via a transmission control or a drive train control. The determination of the desired ratio takes place by means of shift characteristic lines. Starting from the actual gear ratio, a new desired gear ratio is determined while considering the transmission output rpm and the throttle flap position (in torque guided systems, such as in the above-mentioned E-gas systems, while considering the desired transmission output torque). The shift characteristic lines are suitably applied for this purpose for a specific engine-transmission combination. In this way, the operating point of the drive train is fixed for the realization of a transmission output torque at a given transmission output rpm.

In so-called adaptive transmission controls, this operating point can be shifted in dependence upon driver type and/or in dependence upon driving situation in that different shift characteristic lines are applied for different types of drivers and/or driving situations. In this way, the operating point is especially so selected that driver-type specific torque reserves are available at the transmission output. For this purpose, reference is made to U.S. Pat. Nos. 5,157,609 and 5,025,684 as well as ATZ Automobiltechnische Zeitschrift 94 (1992) 9, starting at page 428 and ATZ Automobiltechnische Zeitschrift 95 (1993) 9, starting at page 420.

In continuously variable transmissions, the determination of the desired gear ratio takes place correspondingly via a characteristic field whose input quantities are the throttle flap position and the transmission output rpm.

Such known methods for controlling the drive train are therefore characterized in that:

criteria other than a driver-type specific torque reserve are not systematically considered in the determination of the operating point of the drive train via a determination of the gear ratio by means of shift characteristic lines;

for a specific engine/transmission combination, an application of the shift characteristic lines is necessary which considers characteristics specific to the engine as well as also characteristics specific to the transmission; and, operating conditions of the engine and transmission deviating from normal operation are not systematically considered in the determination of the gear ratio via shift characteristic lines.

SUMMARY OF THE INVENTION

The object of the present invention is to optimize the adjustment of the drive train.

As already mentioned, the invention proceeds from a control of the drive train of a motor vehicle with at least a drive unit having an adjustable output torque and an output rpm. A transmission is arranged between the drive unit and the wheels of the motor vehicle. The transmission exhibits an output torque and its rpm ratio is adjustable. During driving operation, a desired value for the drive torque of the vehicle or for the transmission output torque is pregiven. This input is especially dependent upon the detected position of an accelerator pedal actuable by the driver of the motor vehicle. The different operating points of the drive train are characterized by at least different output torques of the drive unit and rpm ratios and/or different output rpms of the drive unit.

The essence of the invention comprises that, continuously during driving operation, a set of evaluation quantities is determined for possible operating points. With an optimization method, one of the possible operating points is selected as optimal operating point based on the determined evaluation quantities. The transmission ratio, which belongs to this selected optimal operating point, is then adjusted on the transmission. Alternative to the adjustment of the transmission ratio, it is understood that also the output rpm of the drive unit, which belongs to the selected operating point, can be adjusted via a change of the transmission ratio.

The invention affords the advantage that an operating point of the drive train is determined for which the driver command (desired value for the transmission output torque) can be optimally realized for a given transmission output rpm while considering several criteria.

In an advantageous embodiment of the invention, it is provided that the optimization method is carried out in such a manner that the evaluation quantities, which belong to a set, are logically coupled. For selecting the optimal operating point, that operating point is applied at which the coupling result assumes an extreme value. For this purpose, it can be especially provided that the evaluation quantities, which belong to a set, are weighted and that the weighted evaluation quantities are logically coupled to the coupling result.

The logic coupling can be carried out in such a manner that the evaluation quantities, which belong to a set, are logically coupled to a weighted sum. That operating point is applied for selecting the optimal operating point at which the weighted sum assumes an extreme value.

It can be further advantageously provided that at least one of the following quantities is determined: a quantity representing the driving performance of the driver of the motor vehicle, a quantity representing the driving situation of the motor vehicle and/or a quantity representing the instantaneous ambient influences operating on the motor vehicle. At least one of these determined quantities is considered in the determination of the evaluation quantities and/or for the selection of the optimal operating point. The weighting of the evaluation quantities mentioned in the above paragraphs can then be utilized at least in dependence upon one of the determined quantities (driving performance, instantaneous driving situation and/or the instantaneous ambient influences operating on the vehicle).

It is especially advantageous that at least the following are determined as evaluation quantities:

a first value which represents the reserve of the transmission output torque; and/or a second value which represents the total efficiency of the drive train of the vehicle; and/or a third value which represents the emission behavior of different toxic components; and/or a fourth value which represents the sound emission.

The invention provides a special formulation of the optimization problem by a target function and a cost function so that the individual terms of the optimization problem as well as the weighting factors are adapted in correspondence to the driver type and the driver situation.

A computation rule for solving the optimization problem comprises that an approximation solution of the optimization problem is determined via a one-dimensional search method and a suggestion is derived therefrom for an optimal operating point of the drive train.

From the suggestion for an optimal operating point of the drive train, inputs for the engine output torque and the transmission ratio are suitably determined via the coordinated drive train control.

DESCRIPTION OF THE PREFERRED EMBODIMENTS OF THE INVENTION

The invention will be explained with respect to the embodiment described below.

Figure 1:
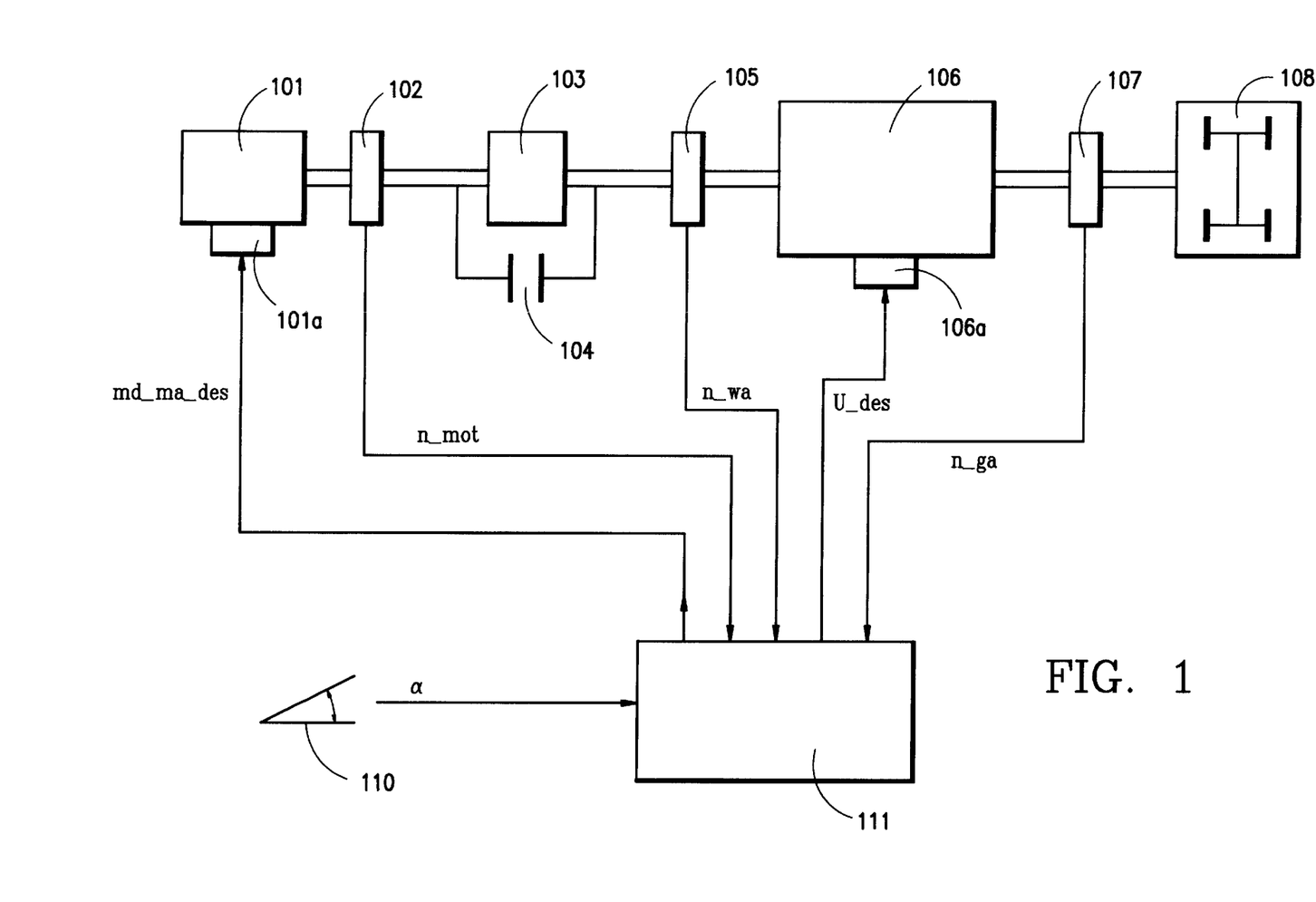
FIGS. 1 and 2 show overview block circuit diagrams of a coordinated drive train control whereas FIGS. 3, 4 and 5 serve to explain the determination of different evaluation quantities.

In FIG. 1, reference numeral 101 identifies the vehicle engine having the corresponding engine control 101a. The output shaft of the engine is connected via the hydraulic torque converter 103 to the input of the transmission 106. The converter 103 can be bridged by a converter bridge clutch 104.

As mentioned in the introduction of the description, a conventional dry-friction clutch can be provided in lieu of the hydrodynamic torque converter 103 and the bridging clutch 104. In this embodiment, it will be assumed that there is a hydrodynamic torque converter having a converter bridge clutch.

The ratio of the transmission 106 can be changed by the transmission control 106a. The engine rpm n_mot or the converter input rpm n_we is detected by the rpm sensor 102; whereas, the transmission input rpm or converter output rpm n_wa is measured by sensor 105 and the transmission output rpm n_ga is measured by the sensor 107. At the output end, the transmission 106 is connected to the drive wheels 108.

The coordinated drive train control 111 receives the position α of the accelerator pedal 110 in addition to the engine rpm n_mot and the transmission output rpm n_ga. The desired torque md_ma_des for the engine 101 and the desired ratio u_des for the transmission are at the output end of the coordinated drive train control 111. These desired quantities are conducted to the engine control 101a and the transmission control 106a.

Figure 2:
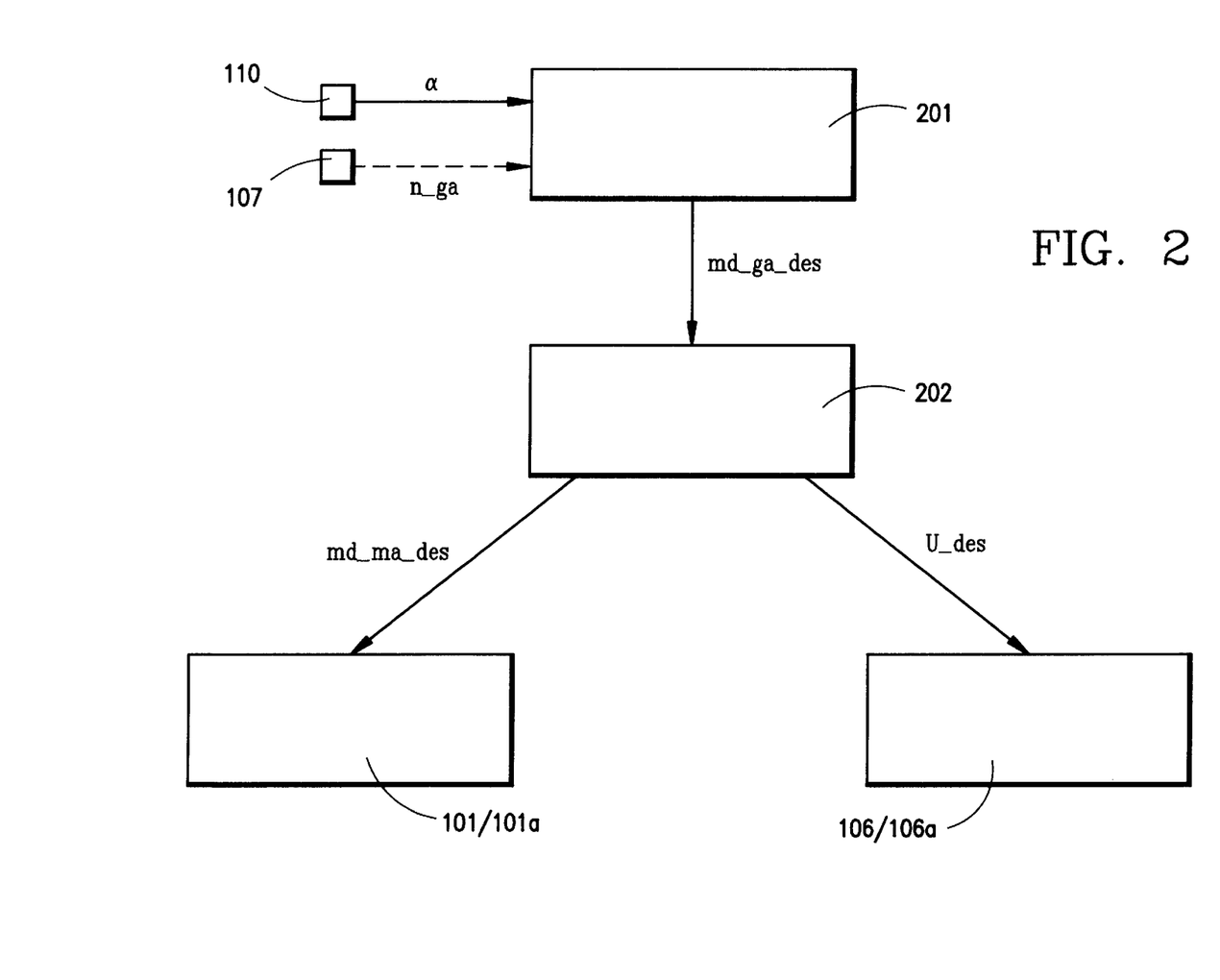

FIG. 2 schematically shows the configuration of the coordinated drive train control 111. In block 201, the desired value md_ga_des for the transmission output torque md_ga is determined from the position α of the accelerator pedal and, if required, while considering the vehicle speed (transmission output rpm n_ga). In the unit 202 still to be described, the desired values for the engine torque (md_ma_des) and for the transmission ratio (u_des) are determined herefrom.

In the following first section, the formulation of the optimization problem according to the invention is illustrated in order to present the computation rule according to the invention for the solution of the optimization problem in a second section. Embedding the optimization method in a coordinated drive train control is outlined in the third section.

1. Formulation of the Optimization Problem

The optimization problem is described via a target function and a cost function. The target function to be maximized is:

$$G = \gamma_{torque} G_{torque} + \gamma_{eta} G_{eta} \rightarrow \max;$$

here, the quantity $G_{torque}$ evaluates the torque reserve at the transmission output end and the quantity $G_{eta}$ is the total efficiency of the drive train. The cost function to be minimized is defined as follows:

$$L = \sum_{i=1}^{i\_Em} \lambda_{emission,i} L_{emission,i} + \lambda_{noise} L_{noise} \to \min;$$

here, i_Em toxic components are considered additively in the exhaust gas. The quantity $L_{noise}$ describes the sound emission of the entire drive train which is determined from the operating state of the drive train.

The optimization problem is formulated as presented below from the task of the simultaneous maximization of G and the minimization of L:

$$F = G - L \to \max.$$

Here, the explicit restrictions apply for the engine rpm n_mot as follows:

n_mot≧n_mot_min, n_mot≦n_mot_max, wherein the values n_mot_min and n_mot_max are the minimum and maximum permissible engine rpms. Since the transmission ratio can be adjusted only within specific limits and the vehicle speed is to remain constant, the following implicit restrictions result for the transmission ratio u and the transmission output rpm n_ga u_min≦u≦u_max, n_ga=const.

The weighting factors $\gamma_{torque}$, $\gamma_{eta}$ as well as $\lambda_{emission,i}$ and $\lambda_{noise}$ are adaptively fixed while considering the type of driver and the driving situation. In this way, the quantity $G_{eta}$ receives a special weight for an economical driver in that the weighting factor $\gamma_{eta}$ is correspondingly selected. In city driving, emission considerations, which are quantified by the quantities $L_{emission,i}$, it are taken into account to a greater extent in that the weighting factors $\lambda_{emission,i}$ are correspondingly selected. If, for example, the driving situation "slow and go" is detected in a zone of little traffic, then the term $L_{noise}$ is especially taken into account by a suitable selection of $\lambda_{noise}$. Furthermore, for the computation of the terms $G_{torque}$, $G_{eta}$, $L_{emission,i}$ and $L_{noise}$, type of driver and driving situation are also taken into account in an applicable manner. The computation rules for the quantities $G_{torque}$, $G_{eta}$, $L_{emission,i}$ and $L_{noise}$ are described in the following.

The determination of a quantity $a_{driver}$, which represents the type of driver, or quantities which describe the instantaneous driving situation, is described in detail in the state of the art referred to initially herein.

1.1 Computation Rule for $G_{torque}$

The quantity $G_{torque}$ evaluates the torque reserve Δmd_ga, which is available for a value pair (u, n_mot) of transmission ratio and engine rpm at the transmission output for a required transmission output torque md_ga_des (block 201, FIG. 2, curve 32 in FIG. 3) for a given transmission output rpm n_ga. The quantity $G_{torque}$ is computed as follows:

1.1.1 Computation of Torque Ratio mue_ges of the Drive Train

The torque ratio mue_ges of the drive train results as a function of the transmission ratio u, the engine rpm n_mot, the instantaneous rpm ratio $v_{conv}$ of the hydrodynamic torque converter 103 and the state $Z_{conv}$ of the converter bridging clutch 104:

mue_ges=mue_ges(u, n_mot, n_ga,$v_{conv}$,$Z_{conv}$)=mue_conv(n_mot, u·n_ga,$v_{conv}$, $Z_{conv}$)·mue_trans (u, n_ga)

In the case of the use of a dry-friction clutch in lieu of the hydrodynamic torque converter 103, the quantity $v_{conv}$ likewise describes the rpm ratio at the clutch, the state $Z_{conv}$ provides in this case the state (open, rubbing, closed) of the dry-friction clutch. The state "rubbing" can also be described numerically by a transferred torque in the case of a converter bridging clutch as well as in the case of a dry-friction clutch.

1.1.2 Computation of the Torque Which can be Made Maximally Available at the Engine Output for the Engine rpm n_mot The torque md_ma_max_n, which can be maximally made available at the engine output for the engine rpm n_mot, results as follows:

md_ma_max_n=md_ma_max (n_mot).

Figure 3:
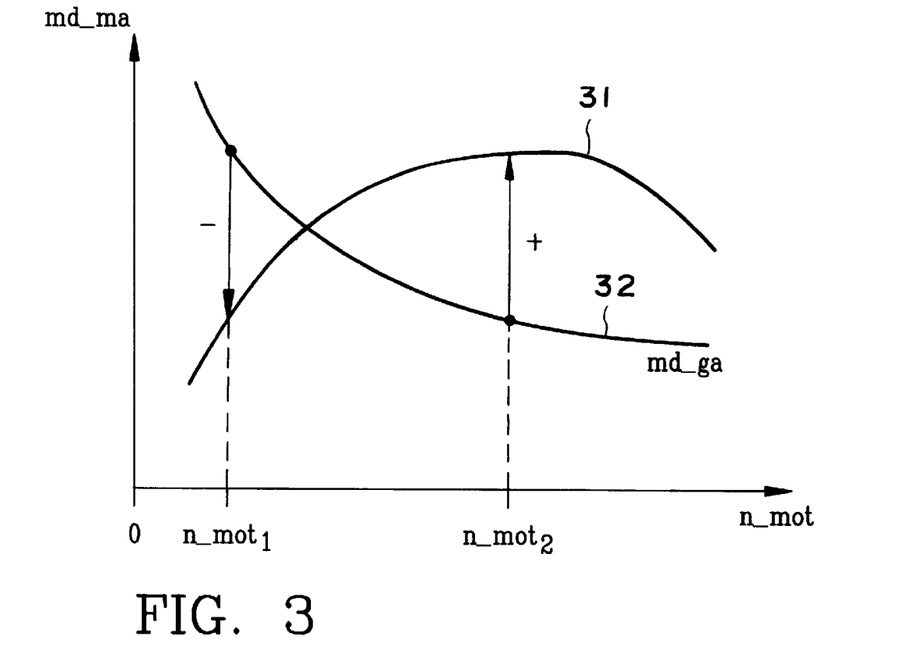

The curve of this so-called full-load line is given as an example by curve 31 in FIG. 3. For the computation, the actual operating conditions of the engine such as engine temperature and ambient influences (for example, air density changes in a drive at high elevations) as well as peripheral conditions under which the torque is realized, are considered. Peripheral condition is, for example, a permitted or not permitted full-load enrichment of the engine.

1.1.3 Computation of the Torque md_ga_max_n, Which Can be Maximally Made Available at the Transmission Output, for the Computed Torque Ratio mue_ges The torque md_ga_max_n, which can maximally be made available at the transmission output for a specific engine rpm n_mot, for the computed torque ratio mue_ges results as the following:

md_ga_max_n=md_ma_max_n·mue_ges.

1.1.4 Computation of the Torque Reserve Δmd_ga at the Transmission Output

The torque reserve Δmd_ga at the transmission output results as follows:

Δmd_ga=md_ga_max_n−md_ga_des.

1.1.5 Norming the Torque Reserve

To norm the torque reserve, the quantity Δmd_ga is set into relationship to the maximum possible torque reserve Δmd_ga_pot, which is possible for the instantaneous transmission output n_ga and the required transmission output torque md_ga_des. For the rpm n_pot, the engine achieves the maximum output power and makes available the torque md_ma_pot at the engine output. For the transmission output rpm n_ga, the maximum possible transmission output torque md_ga_pot is determined as:

$$md\_ga\_pot = md\_ma\_pot \cdot mue\_get\left(u = \frac{n\_pot}{n\_ga}, n\_ga\right)$$

A possible converter amplification is assumed as mue_conv=1. The maximum possible torque reserve is then determined as:

Δmd_ga_pot=md_ga_pot−md_ga_des.

The normed torque reserve at the transmission output is then determined as:

$$\Delta md\_ga\_norm = \frac{\Delta md\_ga}{\Delta md\_ga\_pot}.$$

For $n\_mot=n\_pot$, $\Delta md\_ga\_norm=1$; for a disappearing torque reserve, $\Delta md\_ga\_norm=0$. If the requested transmission output torque cannot be adjusted for the engine rpm $n\_mot$, then a negative value results for $\Delta md\_ga\_norm$.

In FIG. 3, two situations, which are exemplary, for engine rpms $n\_mot_1$ and $n\_mot_2$ are shown. For the engine rpm $n\_mot_1$, a negative value results for the normed torque reserve at the transmission output indicated by a negatively directed arrow. For the engine rpm $n\_mot_2$, a positive value for the normed torque reserve results at the transmission output and is indicated by a positively directed arrow.

1.1.6 Driver-Type Specific Determination of the Desired Normed Torque Reserve $\Delta md\_ga\_norm\ opt$ For the driver-type specific determination of the desired normed torque reserve $\Delta md\_ga\_norm\_opt$, the driver type is described by the quantity $a_{driver}$, wherein $0 \leq a_{driver} \leq 1$. A desired normed torque reserve $\Delta md\_ga\_norm\_opt$ is assigned to the quantity $a_{driver}$ via a function $m_{torque}(a_{driver})$:

$$\Delta md\_ga\_norm\_opt = m_{torque}(a_{driver}).$$

Figure 4:
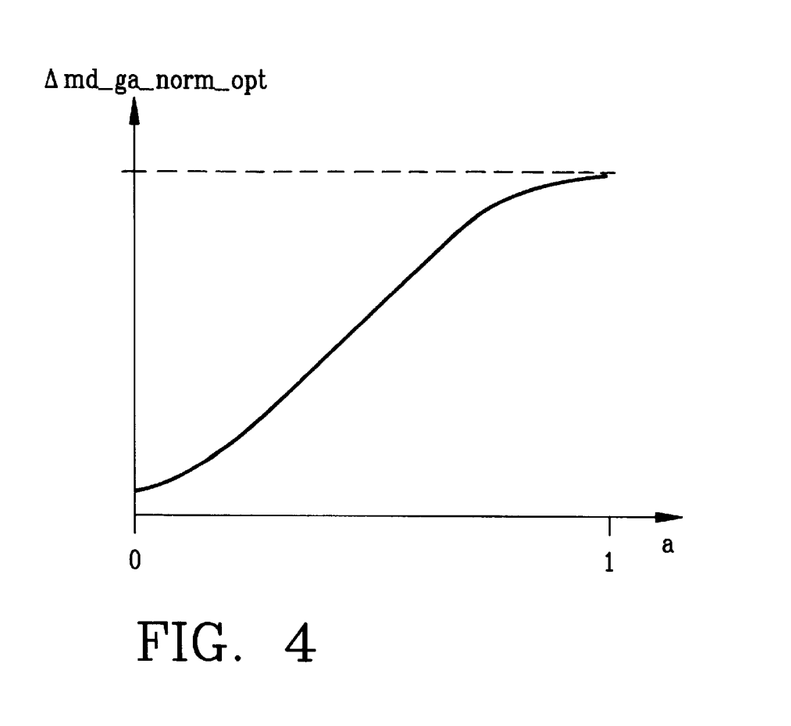

A possible trace of the function $m_{torque}(a_{driver})$ is shown in FIG. 4.

1.1.7 Determination of the Quantity $G_{torque}$ From the Normed Torque Reserve $\Delta md\_ga\_norm$ and the Desired Normed Torque Reserve $\Delta md\_ga\_norm\_opt$ The quantity $G_{torque}$ should make a maximum contribution to the target function G when the normed torque reserve is coincident with the normed desired torque reserve. This maximum amount is scaled to 1. For a disappearing torque reserve, the amount should be 0 and at a negative normed torque reserve, a high negative penalty contribution should be made. The quantity $G_{torque}$ is determined for this purpose with a function $$g_{torque}(\Delta md\_ga\_norm, \Delta md\_ga\_norm\_opt) \text{ as:}$$

$$G_{torque} = g_{torque}(\Delta md\_ga\_norm, \Delta md\_ga\_norm\_opt).$$

Figure 5:
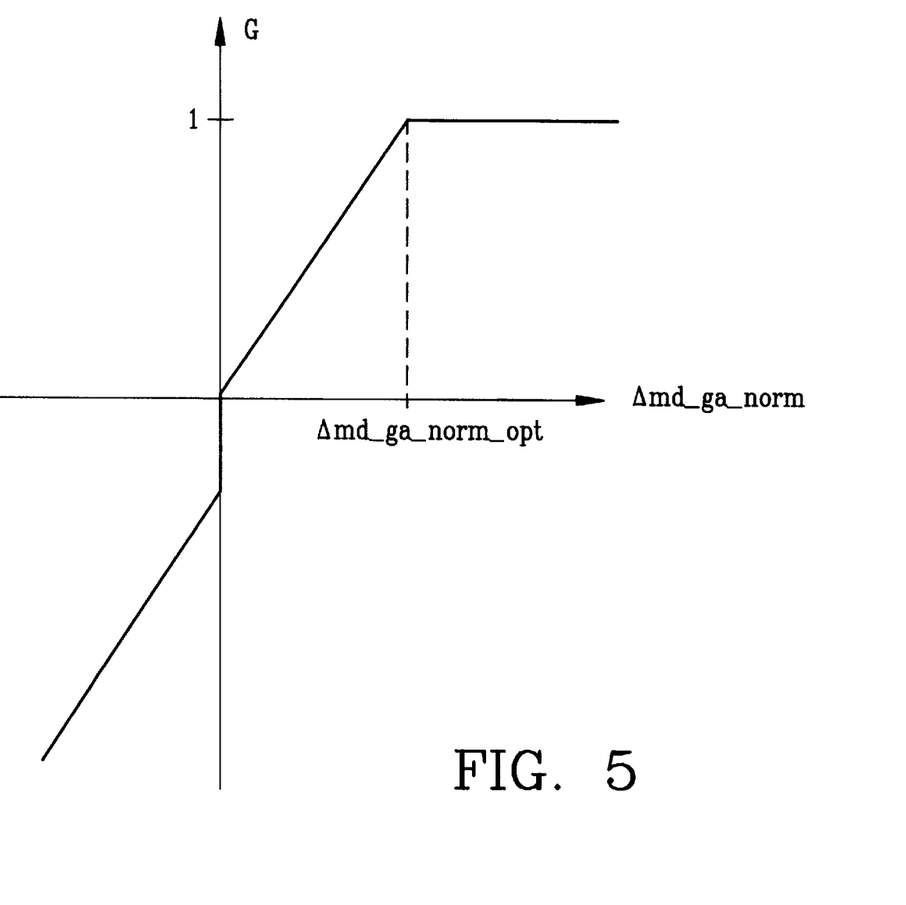

A typical trace of the function $g_{torque}(\Delta md\_ga\_norm, \Delta md\_ga\_norm\_opt)$ is shown in FIG. 5.

In this way, the evaluation quantity $G_{torque}$ is determined for the torque reserve.

1.2 Computation Rule for $G_{eta}$

The quantity $G_{eta}$ defines the total efficiency of the drive train and moves in the interval (0, 1).

If the components engine 101, converter 103 and transmission 106 simultaneously reach their absolute optimal efficiency, then $G_{eta}=1$. For determining $G_{eta}$, the required quantities for characterizing the efficiency of engine 101, converter 103 and transmission 106 are computed as follows:

1.2.1 Computation of Quantity $G_{M,eta}$ for Describing the Engine Efficiency

The quantity $G_{M,eta}$ for describing the engine efficiency is:

$$G_{M,eta} = \frac{b_e^{min}(md\_ma \cdot n\_mot)}{b_e(md\_ma, n\_mot)}.$$

Here, $b_e(md\_ma, n\_mot)$ is the specific fuel consumption for the engine output torque $md\_ma$ and the engine rpm $n\_mot$. The minimum possible specific fuel consumption, with which the engine output power $md\_ma \cdot n\_mot$ can be realized, is $b_e^{min}(md\_ma \cdot n\_mot)$.

The quantity $G_{m,eta}$ becomes 1 when the engine operates at the operating point which is most economical for the commanded engine power and becomes less for unfavorable operating points. The quantity $G_{m,eta}$ moves in the interval (0, 1).

1.2.2 Computation of Quantity $G_{G,eta}$ for Describing the Transmission Efficiency The quantity $G_{G,eta}$ for describing the transmission efficiency results as:

$$G_{G,eta} = \frac{\eta_G(u, n\_ga, md\_ga)}{\eta_G^{max}}.$$

Here, $\eta_G(u, n\_ga, md\_ga)$ is the efficiency with which the transmission outputs the output torque $md\_ga$ for an rpm ratio of $u$ and an output rpm of $n\_ga$. The maximum efficiency of the transmission over the entire operating range is $\eta_G^{max}$. The quantity $G_{M,eta}$ moves in the interval (0, 1).

1.2.3 Computation of the Quantity $G_{W,eta}$ for Describing the Efficiency of the Torque Converter The quantity $G_{W,eta}$ for describing the efficiency of the torque converter results as follows:

$$G_{W,eta} = \eta_{conv}(n\_mot, u \cdot n\_ga, \nu_{conv}, Z_{conv}).$$

The quantity $G_{W,eta}$ likewise moves in the interval (0, 1).

1.2.4 Computation of $G_{eta}$

The evaluation quantity $G_{eta}$ for the entire efficiency of the drive train is then:

$$G_{eta} = G_{M,eta} \cdot G_{G,eta} \cdot G_{W,eta}.$$

1.3 Computation Rule for $L_{emission,i}$

The quantity $L_{emission,i}$ describes the emission characteristic for the toxic component i. Relevant toxic components, for which $L_{emission,i}$ is to be determined, are, for example, $NO_x$, CO and HC.

The determination takes place in accordance with the following computation rule:

1.3.1 Scaling the Specific Emission for the Toxic Component i $$l_{emission,i} = \frac{c_i(md\_ma, n\_mot)}{c_i^{min}(md\_ma \cdot n\_mot)}.$$

Here, $c_i(md\_ma, n\_mot)$ is the specific emission (for example, in g/kWh) for the toxic component i for the engine output torque $md\_ma$ and the rpm $n\_mot$. The minimum possible specific emission, with which the engine output power $md\_ma \cdot n\_mot$ can be realized, is $c_i^{min}(md\_ma, n\_mot)$. The quantity $l_{emission,i}$ becomes 1 when the engine operates at the operating point which is most favorable for emissions and is for the required engine power and for the toxic component i and becomes greater for unfavorable operating points.

1.3.2 Computation of $L_{emission,i}$ from $l_{emission,i}$

For computing $L_{emission,i}$ from $l_{emission,i}$, two applicable alternative computation possibilities are to be applied:

1.3.3.1 Linear Weighting of $l_{emission,i}$ $$L_{emission,i} = l_{emission,i}.$$

1.2.3.2 Non-Linear Weighting of $l_{emission,i}$ by Means of a Barrier Method. Here, Exceeding an Applicable Limit Value $l_{emission,i}^{limit}$ is Evaluated Via an Especially High Amount for Quantity $L_{emission,i}$ Emission Values Below the Limit Value Supply no Contribution $$L_{emission,i} = (\max\{0, l_{emission,i} - l^{limit}_{emission,i}\})^2$$

In this way, the evaluation quantity $L_{emission,i}$ is determined for the emission performance with respect to toxic component i.

1.4 Computation Rule for $L_{noise}$

The quantity $L_{noise}$ describes the sound emission performance of the entire drive train. This quantity is determined for the operating point of the drive train from describing quantities for the sound emission of the engine 101 and of the transmission 106 as:

$$L_{noise} = l_{noise}(L_{noise,engine}, L_{noise,transmission}).$$

2. Computation Rule for Solving the Optimization Problem

An approximation solution $\tilde{F}$ of the above-mentioned optimization problem is determined by the computing rule described below. For this approximation solution $\tilde{F}$, the transmission output torque md_ga is so realized for the given transmission output rpm n_ga that $$F = G - L = \max.$$

Figure 6:
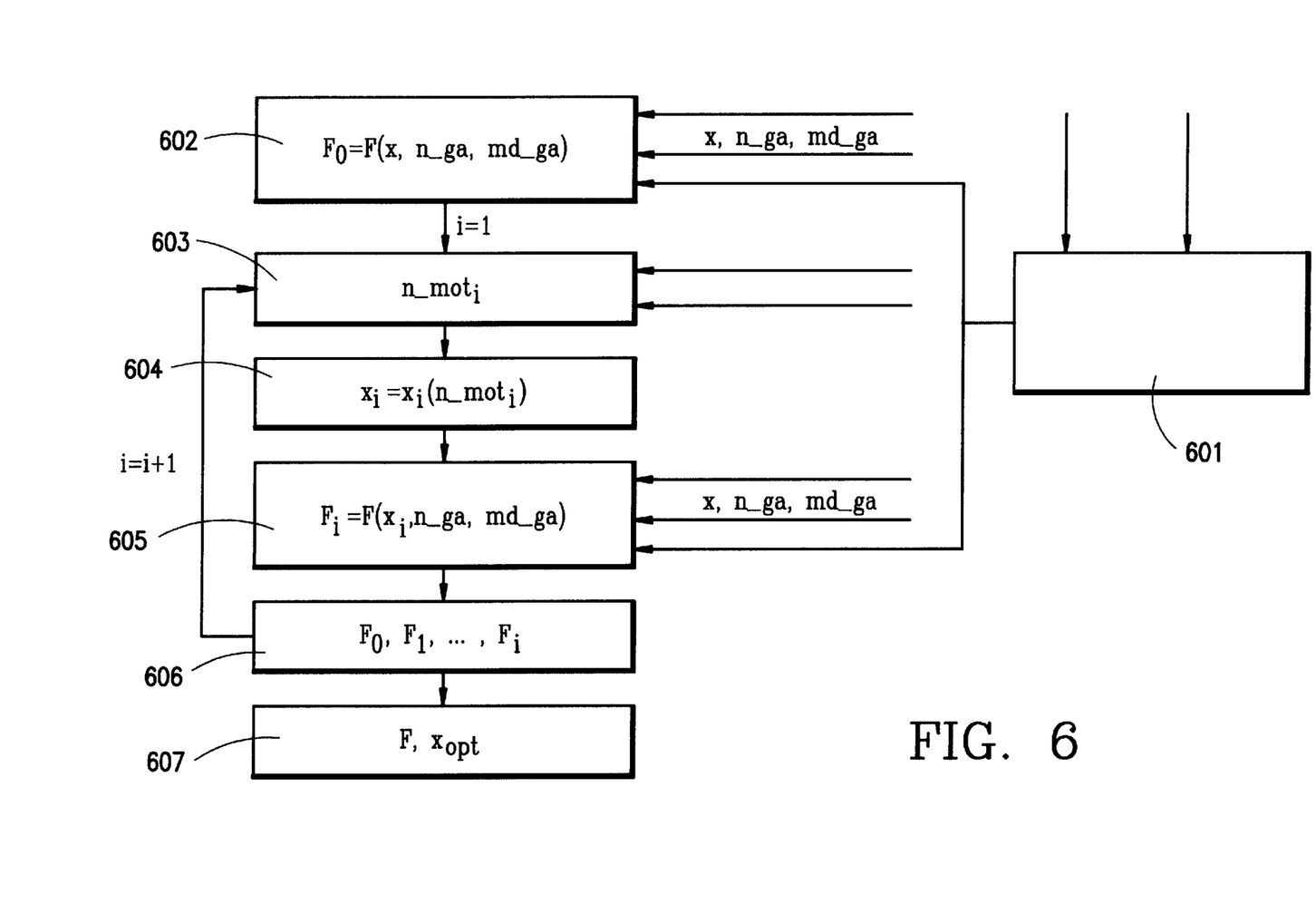
FIG. 6 illustrates schematically the sequence of the computation rule for solving the optimization problem.

This computation rule is schematically shown in FIG. 6.

In step 601, and as already described, the weighting factors $\gamma_{torque}$, $\gamma_{eta}$, $\lambda_{emission,i}$ and $\lambda_{noise}$ are determined.

The determination of the approximation solution $\tilde{F}$ takes place via variation of independent variables n_mot via a one-dimensional search method. For this purpose, the following computation rule is applied:

2.1 Step 602

The value of F is determined for the actual operating point x of the drive train. The actual operating point x is described by:

$$x = \begin{pmatrix} n\_mot \\ md\_ma \\ u \\ v_{conv} \\ Z_{conv} \end{pmatrix}$$

The corresponding value of F is $$F_0 = F(x, n\_ga, md\_ga\_des).$$

The value of F is determined for I additional, possible operating points $x_i (i=1, \ldots, I)$ of the drive train for which the actual transmission output torque md_ga can be realized for the transmission output rpm n_ga. These operating points result via variation of the engine rpm:

$$x_i = x_i(n\_mot_i),$$

i=1, ..., I.

2.2 Step 603

The rpms n_mot$_i$ are determined in accordance with the following computation rule:

$$n\_mot_1 = s_1(n\_mot, F_0)$$

$$n\_mot_2 = s_2(n\_mot, n\_mot_1, F_0, F_1)$$

$$n\_mot_i = s_i(n\_mot, \ldots, n\_mot_{i-1}, F_0, \ldots, F_{i-1})$$

$$n\_mot_I = s_I(n\_mot, \ldots, n\_mot_{I-1}, F_0, \ldots, F_{I-1})$$

For the determination of the quantities n_mot$_i$, the above-described explicit and implicit restrictions of the optimization problem are considered. The functions $s_i$ can also contain information as to the drive train components such as the discrete gear ratio stages for a multi-stage transmission. The number I of the operating points to be investigated can be varied dynamically.

2.3 Step 604

The determination of the operating points $$x = \begin{pmatrix} n\_mot_i \\ md\_ma_i \\ u_i \\ v_{conv,i} \\ Z_{conv,i} \end{pmatrix}$$

takes place in accordance with the following computation rule:

(i) Computation of $$u_i = \frac{n\_mot_i}{n\_ga_i} \cdot v_{conv,i}$$

Here, the rpm ratio and the state of the converter are assumed as being unchanged:

$$v_{conv,i} = v_{conv}$$

$$Z_{conv,i} = Z_{conv}$$

(ii) Computation of $$md\_ma_i = \frac{1}{mue\_ges(u_i, n\_mot_i, n\_ga, v_{conv,i}, Z_{conv,i})} \cdot md\_ga$$

wherein:

$$md\_ga = mue\_ges(u, n\_mot, n\_ga, v_{conv}, Z_{conv}) \cdot md\_ma.$$

The operating points $x_i$, which are so determined, lie on the power hyperbola in the engine characteristic field on which the operating point x also lies. The power hyperbola is corrected by the transmission efficiency.

2.4 Step 605

The determination of the values $F_i$ for the operating points $x_i, i=1, \ldots, I$ takes place in accordance with the computation rule:

$$F_i = F(x_i, n\_ga, md\_ga\_des),$$

i=1, ..., I.

2.5 Steps 606 and 607

The approximation solution $\tilde{F} = F_k$ is characterized by the maximum attained value for F via $F_0$ and all $F_i$:

$$F_k = \max_{j=0}^{I} F_j$$

The corresponding optimal operating point of the drive train is $x_{opt} = x_k$. This operating point is reached at an engine rpm of $$n\_mot\_opt = n\_mot_k.$$

3. Embedding the Optimizing Method in a Coordinated Drive Train Control

Inputs for the engine output torque md_ma_des and the transmission ratio u_des are determined via a coordinated drive train control while considering the suggestion for an optimal operating point $x_{opt}$ of the drive train. This suggestion is determined via the solution of the optimization problem. FIG. 2, which was already described, shows the basic structure of a coordinated drive train control for realizing the transmission output torque md_ga_des required by the driver.

The inputs for md_ma_des and u_des are determined from the optimal operating point $x_{opt}$ (determined in step 607) of the drive train as:

$$u\_des = f(x_{opt})$$

$$md\_ma\_des = \frac{1}{mue\_ges} \cdot md\_ga\_des.$$

Accordingly, the gear ratio u_des is adjusted on the transmission, which ratio is pregiven by the optimal operating point $x_{opt}$ of the drive train.

The procedure according to the invention advantageously offers the possibility to optimally realize the driver command while considering several criteria.

The criteria are systematically considered based on physical quantities for the total efficiency of the drive train, the torque reserve at the transmission output as well as toxic substance and sound emissions. In this way, an operating point of the drive train is determined which is proper for different driving situations and types of driver as well as requirements as to toxic substance and sound emissions. The weighting of the relevant criteria can be adaptively changed during the driving operation.

The determination of the optimal operating point takes place based on a model and starting from physical describing quantities for engine and transmission characteristics.

An application of characteristic quantities, which are dependent upon the special engine transmission combination, is therefore not necessary.

Furthermore, operating conditions of engine and transmission, which deviate from normal operation, are systematically considered in the determination of the optimal operating point via the method according to the invention.

Overview of reference characters used md_ma engine output torque
md_ma_des desired value for the engine output torque
md_ga transmission output torque
md_ga_des desired value for the transmission output torque
Δmd_ga torque reserve at the transmission output
n_ga transmission output rpm
n_mot engine rpm
n_mot_min minimum permissible engine rpm
n_mot_max maximum permissible engine rpm
u rpm ratio of the transmission
u_min minimum adjustable transmission ratio
u_max maximum adjustable transmission ratio
mue_ges torque ratio of the drive train
$v_{conv}$ rpm ratio of the (hydrodynamic) torque converter $$v_{conv} = \frac{n\_wa}{n\_we},$$

wherein n_wa: converter output rpm
n_we: converter input rpm
$Z_{conv}$ state of the converter bridging clutch or clutch
α position of the accelerator pedal
$a_{driver}$ quantity for describing the type of driver
$\gamma_{torque}, \gamma_{eta}$ weighting factors
$\lambda_{emission,i}, \lambda_{noise}$ weighting factors
md_ma_max maximum engine torque which can be made available
md_ma_max_n maximum engine torque which can be made available at the engine output for the engine rpm n_mot
md_ga_max_n maximum torque which can be made available at the transmission output for the engine rpm n_mot
$G_{torque}$ evaluation quantity for the torque reserve
$G_{eta}$ evaluation quantity for the total efficiency of the drive train
$G_{M,eta}$ evaluation quantity for describing the engine efficiency
$G_{G,eta}$ evaluation quantity for describing the transmission efficiency
$G_{W,eta}$ evaluation quantity for describing the efficiency of the torque converter
$L_{emission,i}$ evaluation quantity for describing the emission performance for the toxic component i
$L_{noise}$ evaluation quantity for describing the noise emission behavior of the entire drive train
x instantaneous operating point of the drive train

What is claimed is:

1. A method for controlling the drive train of a motor vehicle having at least a drive unit and a transmission whose rpm ratio (u) can be adjusted, the drive unit having an adjustable output torque (md_ma) and an output rpm (n_mot) and the transmission having an output torque (md_ga) and being arranged between the drive unit and the wheels of the motor vehicle; a desired value (md_ga_des) being pregiven for the transmission output torque, especially in dependence upon the detected position of an accelerator pedal actuable by the driver of the motor vehicle; and, different operating points ($x_i$) of the drive train being characterized by at least different output torques (md_ma$_i$) of the drive unit and rpm ratios (u$_i$) and/or different output rpms (n_mot$_i$) of the drive unit; the method comprising performing the following steps during driving operation of said motor vehicle:

determining sets of evaluation quantities ($G_{torque}$, $G_{eta}$, $L_{emission,i}$, $L_{noise}$) for possible ones of said operating points ($x_i$), respectively;

utilizing an optimization method to logically couple said evaluation quantities ($G_{torque}$, $G_{eta}$, $L_{emission,i}$, $L_{noise}$) belonging to each one of said sets and applying that one of said operating points ($x_i$) at which the result (F) of the logical coupling assumes an extreme value to select one of the possible operating points ($x_i$) as an optimal operating point ($x_{opt}$); and, adjusting the transmission ratio (u) of said drive unit to a transmission ratio ($u_{opt}$) corresponding to the selected operating point ($x_{opt}$) and/or adjusting the output rpm (n_mot) of said drive unit corresponding to the selected operating point ($x_{opt}$).

2. The method of claim 1, wherein the evaluation quantities ($G_{torque}$, $G_{eta}$, $L_{emission,i}$, $L_{noise}$), which belong to one of said sets, are weighted and the weighted evaluation quantities are logically coupled to the coupling result (F).

3. The method of claim 2, wherein one of the following is determined: a quantity representing the driving performance of the driver of the vehicle, a quantity representing the instantaneous driving situation of the motor vehicle and/or a quantity representing the ambient influences operating instantaneously on the motor vehicle; and, at least one of these determined quantities is applied to the weighting of the evaluation quantities.

4. The method of claim 2, wherein one of the following is determined: a quantity representing the driving performance of the driver of the vehicle, a quantity representing the instantaneous driving situation of the motor vehicle and/or a quantity representing the ambient influences operating instantaneously on the motor vehicle; and, at least one of these determined quantities is applied to the weighting of the evaluation quantities.

5. The method of claim 1, wherein the optimization method is carried out in such a manner that the evaluation quantities ($G_{torque}$, $G_{eta}$, $L_{emission,i}$, $L_{noise}$), which belong to one of said sets, are logically coupled to a weighted sum (F) and that, for the selection of the optimal operating point ($x_{opt}$), that operating point is applied for which the weighted sum (F) assumes an extreme value.

6. The method of claim 1, wherein at least one of the following is determined: a quantity representing the driving performance of the driver of the motor vehicle, a quantity representing the instantaneous driving situation of the motor vehicle and/or a quantity representing the ambient influences operating instantaneously on the motor vehicle; and, at least one of these determined quantities is considered in the determination of the evaluation quantities ($G_{torque}$, $G_{eta}$, $L_{emission,i}$, $L_{noise}$) and/or in the selection of the optimal operating point ($x_{opt}$).

7. The method of claim 1, wherein at least the following are determined as evaluation quantities:

a first value ($G_{torque}$) which represents the reserve of the transmission output torque; and/or a second value ($G_{eta}$), which represents the total efficiency of the drive train of the vehicle; and/or a third value ($L_{emission,i}$) which represents the emission performance of different toxic components (i); and/or a fourth value ($L_{noise}$) which represents the sound emission.

8. A method for controlling the drive train of a motor vehicle having at least a drive unit and a transmission whose rpm ratio (u) can be adjusted, the drive unit having an adjustable output torque (md_ma) and an output rpm (n_mot) and the transmission having an output torque (md_ga) and being arranged between the drive unit and the wheels of the motor vehicle; a desired value (md_ga_des) being pregiven for the transmission output torque, especially in dependence upon the detected position of an accelerator pedal actuable by the driver of the motor vehicle; and, different operating points ($x_i$) of the drive train being characterized by at least different output torques (md_ma$_i$) of the drive unit and rpm ratios (u$_i$) and/or different output rpms (n_mot$_i$) of the drive unit; the method comprising performing the following steps during driving operation of said motor vehicle:

determining at least the following as evaluation quantities:

a first value ($G_{torque}$) which represents the reserve of the transmission output torque; and/or a second value ($G_{eta}$), which represents the total efficiency of the drive train of the vehicle; and/or a third value ($L_{emission,i}$) which represents the emission performance of different toxic components (i); and/or a fourth value ($L_{noise}$) which represents the sound emission;

determining a set of said evaluation quantities ($G_{torque}$, $G_{eta}$, $L_{emission,i}$, $L_{noise}$) for possible ones of said operating points ($x_i$);

selecting one of said possible ones of said operating points ($x_i$) as optimal operating point ($x_{opt}$) by utilizing an optimization method based on said detected evaluation quantities; and, adjusting the transmission ratio (u) of said drive unit to a transmission ratio ($u_{opt}$) corresponding to the selected operating point ($x_{opt}$) and/or adjusting the output rpm (n_mot) of said drive unit corresponding to the selected operating point ($x_{opt}$).

9. The method of claim 8, wherein the optimization method is carried out in such a manner that the evaluation quantities ($G_{torque}$, $G_{eta}$, $L_{emission,i}$, $L_{noise}$) are logically coupled to form a coupling result (F) and that, for the selection of the optimal operating point ($x_{opt}$), that operating point is applied for which the coupling result (F) assumes an extreme value.

10. The method of claim 9, wherein the evaluation quantities ($G_{torque}$, $G_{eta}$, $L_{emission,i}$, $L_{noise}$) are weighted and the weighted evaluation quantities are logically coupled to the coupling result (F).

11. The method of claim 8, wherein the optimization method is carried out in such a manner that the evaluation quantities ($G_{torque}$, $G_{eta}$, $L_{emission,i}$, $L_{noise}$) are logically coupled to a weighted sum (F) and that, for the selection of the optimal operating point ($x_{opt}$), that operating point is applied for which the weighted sum (F) assumes an extreme value.

12. The method of claim 8, wherein at least one of the following is determined: a quantity representing the driving performance of the driver of the motor vehicle, a quantity representing the instantaneous driving situation of the motor vehicle and/or a quantity representing the ambient influences operating instantaneously on the motor vehicle; and, at least one of these determined quantities is considered in the determination of the evaluation quantities ($G_{torque}$, $G_{eta}$, $L_{emission,i}$, $L_{noise}$) and/or in the selection of the optimal operating point ($x_{opt}$).

13. An arrangement for controlling the drive train of a motor vehicle having at least a drive unit and a transmission whose rpm ratio (u) can be adjusted, the drive unit having an adjustable output torque (md_ma) and an output rpm (n_mot) and the transmission having an output torque (md_ga) and being arranged between the drive unit and the wheels of the motor vehicle; wherein different operating points ($x_i$) of the drive train are characterized by at least different output torques (md_ma$_i$) of the drive unit and rpm ratios (u$_i$) and/or different output rpms (n_mot$_i$) of the drive unit; the arrangement comprising means which, during driving operation of said motor vehicle, is adapted to:

determine a set of evaluation quantities ($G_{torque}$, $G_{eta}$, $L_{emission,i}$, $L_{noise}$) for possible operating points ($x_i$);

utilize an optimization method to logically couple said evaluation quantities ($G_{torque}$, $G_{eta}$, $L_{emission,i}$, $L_{noise}$) belonging to one of said sets to form a result (F) and applying that one of said operating points ($x_i$) at which the result (F) of the logical coupling assumes an extreme value to select one of the possible operating points ($x_i$) as an optimal operating point ($x_{opt}$); and, adjust the transmission ratio (u) of said drive unit to a transmission ratio ($u_{opt}$) corresponding to the selected operating point ($x_{opt}$) and/or adjust the output rpm (n_mot) of said drive unit corresponding to the selected operating point ($x_{opt}$).

14. An arrangement for controlling the drive train of a motor vehicle having at least a drive unit and a transmission whose rpm ratio (u) can be adjusted, the drive unit having an adjustable output torque (md_ma) and an output rpm (n_mot) and the transmission having an output torque (md_ga) and being arranged between the drive unit and the wheels of the motor vehicle; a desired value (md_ga_des) being pregiven for the transmission output torque, especially in dependence upon the detected position of an accelerator pedal actuable by the driver of the motor vehicle; and, different operating points ($x_i$) of the drive train being characterized by at least different output torques ($md\_ma_i$) of the drive unit and rpm ratios ($u_i$) and/or different output rpms ($n\_mot_i$) of the drive unit; the arrangement comprising means which, during driving operation of said motor vehicle, is adapted to:

determine at least the following as evaluation quantities:

a first value ($G_{torque}$) which represents the reserve of the transmission output torque; and/or         a second value ($G_{eta}$), which represents the total efficiency of the drive train of the vehicle; and/or         a third value ($L_{emission,i}$) which represents the emission performance of different toxic components (i); and/or         a fourth value ($L_{noise}$) which represents the sound emission;

determine a set of said evaluation quantities ($G_{torque}$, $G_{eta}$, $L_{emission,i}$, $L_{noise}$) for each possible one of said operating points ($x_i$);

select one of said possible ones of said operating points ($x_i$) as optimal operating point ($x_{opt}$) by utilizing an optimization method based on said detected evaluation quantities; and,     adjust the transmission ratio (u) of said drive unit to a transmission ratio ($u_{opt}$) corresponding to the selected operating point ($x_{opt}$) and/or adjust the output rpm (n_mot) of said drive unit corresponding to the selected operating point ($x_{opt}$).

15. The arrangement of claim 14, wherein the optimization method is carried out in such a manner that the evaluation quantities ($G_{torque}$, $G_{eta}$, $L_{emission,i}$, $L_{noise}$) are logically coupled to form a coupling result (F) and that, for the selection of the optimal operating point ($x_{opt}$), that operating point is applied for which the coupling result (F) assumes an extreme value.

16. The arrangement of claim 15, wherein the evaluation quantities ($G_{torque}$, $G_{eta}$, $L_{emission,i}$, $L_{noise}$) are weighted and the weighted evaluation quantities are logically coupled to the coupling result (F).

\* \* \* \* \*